A. B. RONEY.
VENT FAUCET
No. 181,724. Patented Aug. 29, 1876.
*Fig. 2.*
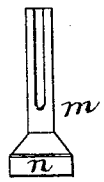
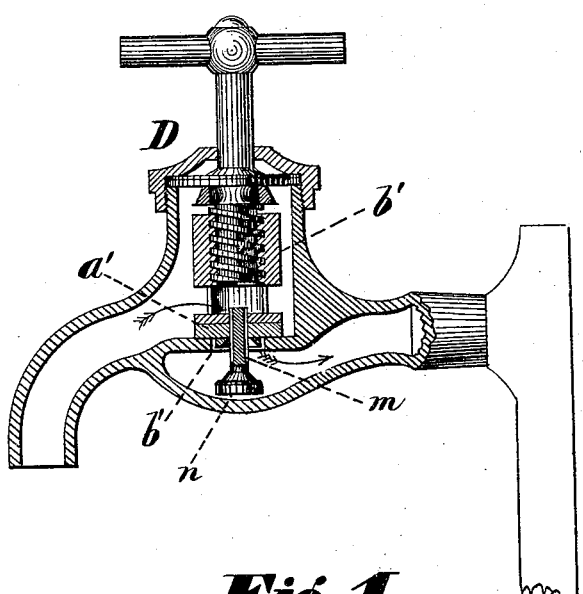
*Fig. 1*
Witnesses
F. A. Pollock
E. M. Smith
Alexander B. Roney, Inventor
By Connolly Bros & W Tighe, Attorneys

UNITED STATES PATENT OFFICE.

ALEXANDER B. RONEY, OF PITTSBURG, PENNSYLVANIA, ASSIGNOR OF ONE-HALF OF HIS RIGHT TO CHRISTOPHER I. O'CONNOR, OF SAME PLACE.

IMPROVEMENT IN VENT-FAUCETS.

Specification forming part of Letters Patent No. 181,724, dated August 29, 1876; application filed June 13, 1876.

*To all whom it may concern:*

Be it known that I, ALEXANDER B. RONEY, of Pittsburg, in the county of Allegheny and State of Pennsylvania, have invented certain new and useful Improvements in Bib Waste-Cocks; and I do hereby declare the following to be a full, clear, and exact description of the invention, such as will enable others skilled in the art to which it pertains to make and use it, reference being had to the accompanying drawings, which form part of this specification, in which—

Figure 1 is a vertical section of my invention. Fig. 2 is a detail and section of the puppet-valve in the bib.

This invention has relation to bib waste-cocks; and has for its object the provision of means for giving automatic access of air to the pipe when the liquid-pressure is withdrawn by the closing of the stop-cock below.

Said invention specifically consists in the combination, with the partitioned body and perforated valve of a bib-cock for water-pipes, of a puppet-valve provided with a float and having a grooved or channeled stem, said valve being adapted to fall by gravity, and to rise by the pressure of the water, so as to open and close the air-vents. Thus, then, the closing of the stop-cock instantly admits air through the bib, and the waste flows off without further attention.

Referring to the drawings herewith, my construction is as follows: D represents the bib, which is used generally in connection with a stop-cock below. The construction of the bib may be of any of the now usual forms. I perforate the valve $a'$ and lower portion of the plug $b'$, the latter being also countersunk on its under surface, and into this I fit the puppet $m$, which has its stem grooved, as shown, or perforated, or squared off, a portion of its length, and has the conical bearing shown. It is also fitted with a float-cork, $n$, but which is not essential to effective operation. The pressure of the head of water keeps the valve $m$ tightly closed; but the instant the pressure is taken off the puppet-valve $m$ drops till its vent-channels register with the supply side of the bib, and air is freely admitted to allow the water to waste below. Hence its action is entirely automatic.

Thus constructed and used in connected operation there is no possibility whatever of water remaining in the pipes to freeze and burst them. There is no danger from forgetfulness. The devices are automatic. The instant the stop-cock valve is closed the waste is open, and thus, pressure being released, the bib admits air of its own accord, and all water wastes out of the pipe.

Having fully described my invention, I claim—

1. In combination with the partition-body and peforated valve of a bib-cock, a puppet-valve, $m$, provided with a float, and having a grooved or channeled stem, said puppet-valve being adapted to fall by gravity and to rise by the pressure of the water, so as to open and close the air-vents, substantially as described.

2. In combination with the valve of a bib-cock, perforated as shown, a grooved or channeled puppet or other valve, $m$, substantially as shown and described.

In testimony that I claim the foregoing I have hereunto set my hand this 31st day of May, 1876.

ALEXANDER B. RONEY.

Witnesses:
 THOS. J. MCTIGHE,
 SAMUEL ANDERSON.